United States Patent [19]

Boche

[11] 4,159,753
[45] Jul. 3, 1979

[54] CRUISE CONTROL DEVICE FOR VEHICLES

[76] Inventor: Paul H. Boche, 210 Waneta Dr., Oakville, Ontario, Canada

[21] Appl. No.: 830,071

[22] Filed: Sep. 2, 1977

[51] Int. Cl.² .............................................. B60K 31/00
[52] U.S. Cl. ................................. 180/177; 123/103 R; 123/103 C; 123/103 E
[58] Field of Search ................... 180/108, 105 E, 109; 123/103 R, 103 E, 103 B, 103 C

[56] References Cited

U.S. PATENT DOCUMENTS

| | | | |
|---|---|---|---|
| 2,726,728 | 12/1955 | Ayle | 180/105 E |
| 3,053,990 | 9/1962 | Von Berg et al. | 180/109 |
| 3,177,968 | 4/1965 | Goerke et al. | 180/108 |
| 3,727,714 | 4/1973 | Ishikawa | 180/108 |
| 3,923,020 | 12/1975 | Gilligan | 123/103 C |
| 3,982,509 | 9/1976 | Colling et al. | 180/109 |
| 4,056,082 | 11/1977 | Noiles | 123/103 R |

Primary Examiner—Joseph F. Peters, Jr.
Assistant Examiner—Donn McGiehan
Attorney, Agent, or Firm—Ridout & Maybee

[57] ABSTRACT

A speed control device for a vehicle driven by an internal combustion engine comprises a longitudinally movable actuator member connected to the accelerator control linkage of the engine, a longitudinally movable abutment member, a device for optionally locking the abutment member against longitudinal movement, a spring and a flexible diaphragm connecting the actuator and abutment members, and means for applying manifold vacuum from the internal combustion engine to the diaphragm whereby to vary the relative positions of the actuator and abutment members. Preferably the device locking the abutment member is controlled by an acceleration responsive device so as to unlock the abutment whenever the vehicle is subjected to more than a predetermined degree of deceleration.

5 Claims, 5 Drawing Figures

CRUISE CONTROL DEVICE FOR VEHICLES

FIELD OF THE INVENTION

This invention relates to speed control systems for vehicles with internal combustion engines, and more particularly to systems known as cruise control systems which are operative to control the vehicle engine so as to maintain the vehicle at a predetermined speed.

BACKGROUND OF THE INVENTION

A number of cruise control systems for vehicles have been proposed or utilized in the past, but most of these have required relatively complex control systems which cannot be incorporated into existing vehicles without significant modification of the latter. Moreover, many such systems are useful either only with compression ignition engines or only with spark ignition engines, and have certain disadvantages in operation. It has been recognized that it is desirable that the driver of a vehicle be able to override a cruise control system for example when he wishes to overtake another vehicle or accelerate temporarily for some other reason. Although provision for this has been made in some known systems, exercise of such an override normally disengages the system which must be reset before it will resume control of the vehicle. Additionally, it is desirable that the cruise control system be automatically disengaged should the driver apply the brakes of the vehicle. It would also be desirable to ensure that the system is disengaged when the vehicle is descending a steep hill, or should the vehicle be suddenly decelerated for any other reason, whether or not the brakes are applied. Existing systems in which control is cancelled only upon application of the vehicle brakes are defective in these latter respects.

A further disadvantage of many known systems of cruise control is that they are incompatible with and would disturb the operation of the governor systems applied to many vehicles, especially those with diesel engines.

The present invention is directed to providing a cruise control device of simple construction which may readily be fitted to most vehicles without any significant degree of modification of the latter, and without disturbing the operation of any existing governor device applied to the vehicle engine. Moreover the system can readily be arranged to disengage whenever the vehicle is sharply decelerated or travels down a steep hill.

SUMMARY OF THE INVENTION

According to the invention, a cruise control device for a vehicle comprises a movable actuator member for connection to the accelerator linkage of the vehicle, a normally freely movable abutment member, a latch device operable to latch the abutment member in any of a range of positions, and a resilient connection established between the actuator member and the abutment member through a vacuum actuator in connection with the inlet manifold of the vehicle engine. Preferably the vacuum actuator is provided by a casing divided into two chambers by a flexible diaphragm, one of the actuator member and the abutment member being connected to the casing and the other passing through the casing and having a connection to the diaphragm. A vacuum pipe connects one of the chambers to the inlet manifold of the engine. A spring is preferably provided acting between the diaphragm and the casing so as to control the relationship between the vacuum applied to the one chamber and the relative displacement of the actuator member and the abutment member.

With such an arrangement, only a single connection to the existing accelerator linkage of a vehicle is required, and this linkage need not otherwise be modified. By latching the abutment member in a fixed position once a desired vehicle speed has been reached, thus immobilizing either the connection to the diaphragm or the actuator casing, the vacuum applied to the actuator from the vehicle engine inlet manifold will thereafter move the actuator member and hence the accelerator linkage so as to tend to maintain a more or less constant vehicle speed, tending to reduce the output of the engine in response to increased vehicle speed and vice-versa. The size of the diaphragm and the strength of the control spring should be selected so as to provide an optimum control characteristic.

The latch is preferably under the control of a bistable accelerometer controlled switch, so that it can only be caused to latch when the switch is in one stable position which it can enter only under the influence of positive acceleration of the vehicle and will leave under the influence of a predetermined negative acceleration of the vehicle. In the other switch position, latching cannot be maintained. Since common accelerometers are unable to distinguish between forces due to inertia and forces due to gravity, this means that the latch will always disengage when the vehicle decelerates at more than a predetermined rate or descends an incline producing an equivalent gravitational component in the direction of travel of the vehicle. The latch cannot be reengaged until the vehicle has been again accelerated or ascends an incline producing an equivalent gravitational component. Conveniently, the latch is electrically controlled by a solenoid, and the switch is a mercury switch tiltable between two stable positions.

Further features of the invention will become apparent from the following description with reference to the accompanying drawings.

SHORT DESCRIPTION OF THE DRAWINGS

In the drawings:

FIG. 1 illustrates the application of a preferred embodiment of the invention to a motor vehicle, the cruise control device of the invention being shown partly in section, and only those portions of the vehicle being shown which are necessary to the description of the invention, FIG. 2 is a view on the line 2—2 in FIG. 1, FIG. 3 is a schematic diagram of an electrical control system suitable for use with the embodiment of FIGS. 1 and 2, and FIGS. 4a and 4b show in elevation a bistable switch device forming part of the system of FIG. 3.

DESCRIPTION OF THE PREFERRED EMBODIMENT

Figure 1:
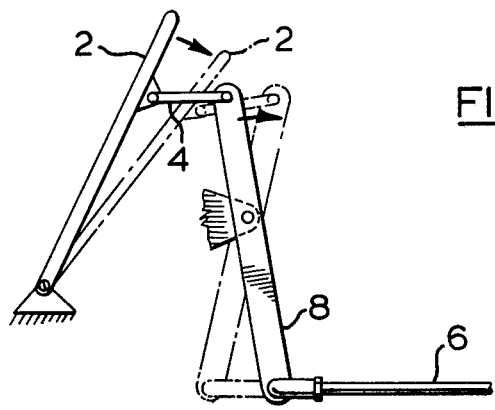

Referring first to FIG. 1, there is shown the accelerator pedal 2 of a vehicle, and an accelerator linkage comprising rods 4 and 6 and a lever 8 transmitting movements of the pedal to a control arm 10 which acts to vary the displacement of a fuel pump 12 of a diesel engine (the remainder of which is not shown) of the vehicle. It will be understood that the particular form of linkage shown is illustrative only, and will be subject to wide variation according to the type of vehicle. Moreover, instead of the arm 10 controlling the fuel pump of a diesel engine, it may control the throttle valve of a spark ignition engine and/or the fuel pump of such an engine if fitted with fuel injection equipment: all that is important is that the accelerator linkage controls the power output of the engine.

The apparatus of the invention is connected to this linkage by an actuator member in the form of a rod 14, which is shown pivoted to the arm 10: it could however be connected by any suitable means to some other point in the linkage if more convenient, provided that movement of the pedal 2 and the accelerator linkage will result in corresponding conjoint longitudinal movement of the rod 14. The rod 14 passes through one end of a cylindrical housing 16, and is secured by a suitable connection to the centre of a flexible diaphragm 18 which divides the housing into two chambers 20 and 22. The other end of the housing 16 is connected to a tail rod 24, the rods 14 and 24 and the housing 16 being coaxial.

Figure 2:
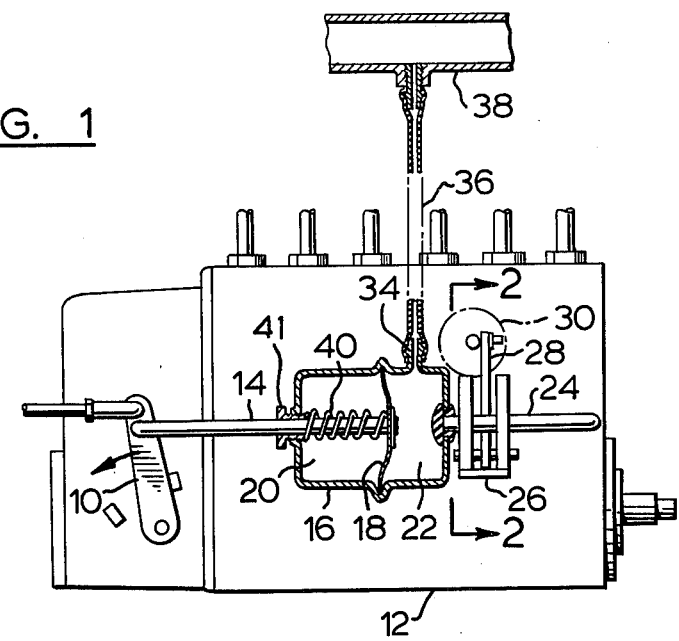
Figure 2:
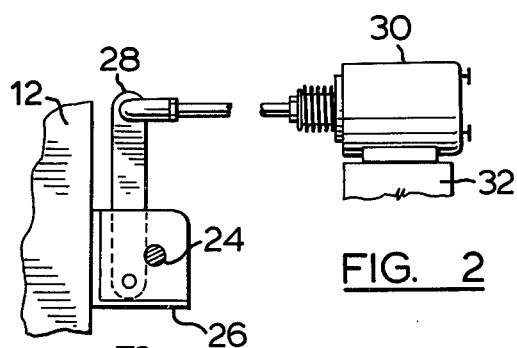

The tail rod 24 passes with a sliding fit through apertures in a bracket 26 mounted on the pump 12 or some other convenient part of the vehicle structure, and may be clamped against sliding movement relative to the bracket by a lever 28 pivoted to the bracket. The lever 28 is actuated by an actuator 30, also mounted on some convenient portion 32 of the vehicle structure, as shown in FIG. 2, the lever 28 and actuator 30 together forming a clamp device. The actuator 30 will normally be an electrically operated solenoid, but equivalent pneumatic or hydraulic actuators may be employed provided that the control system to be described below is suitably modified. The tail rod 24, when clamped by the lever 28, forms an abutment member which maintains stationary the housing 16: when the rod 24 is not clamped, the rod and housing may move freely, and the accelerator linkage functions as if the connection to the rod 14 was not present. The housing 16 may if desired be reversed so that the rod 14 is attached to the casing and the rod 24 to the diaphragm, without in any way affecting operation of the apparatus. Moreover, the housing and diaphragm arrangement described could be replaced by other forms of vacuum actuator, such as a resilient metal bellows unit connected between the rods 14 and 24.

An outlet 34 from the chamber 22 is connected by a flexible pipe 36 to the inlet manifold 38 of the engine so that changes in the subatmospheric pressure occurring in the manifold during operation of the engine are transmitted to the chamber 22, thus causing movement of the diaphragm 18 relative to the housing and in turn movement of the rod 14 relative to the rod 24. The extent of such movement depends on the characteristics of the diaphragm and of a spring 40 acting between the casing and the diaphragm. The spring 40 is selected so as to provide a suitable range of movement of the diaphragm to operate the arm 10 through its range in response to the range of partial vacuums which can be applied to the chamber 22 from the manifold 38. If the rod 24 is clamped, the extent of movement will also depend to some extent on the resistance offered by the accelerator linkage due to any return spring associated with that linkage. This resistance should be small compared to that offered by the diaphragm and the spring 40. The action of the spring 40 may be adjusted by means of a gland nut 41.

Assuming the rod 24 to be unclamped, if the pedal 2 is used to accelerate the vehicle to a given speed, and the rod 24 is then clamped and the pedal 2 released, then the position of the rod 14 will be controlled by the position of the diaphragm 18 and hence by the degree of vacuum in the manifold 38. If the speed of the vehicle engine decreases due to increased load, for example due to the vehicle reaching an incline, the degree of vacuum will decrease and the diaphragm will move to the left (as seen in FIG. 1), with the same effect as if the accelerator pedal has been depressed, thus tending to compensate for the extra load. If the speed of the vehicle increases, for example due to the vehicle reaching a decline, the opposite process occurs. The changes of vehicle speed which would normally result from such load changes, were there no movement of the accelerator linkage, are thus greatly reduced, so that the vehicle maintains a substantially constant speed, provided of course that such a speed is consistent with the power output or engine braking capabilities of the vehicle having regard to the selected gearing between the engine and the driving wheels of the vehicle. Should it be desired temporarily to increase the vehicle speed, for example to overtake another vehicle, then the action of the diaphragm 18 and the spring may be overridden simply by depressing the accelerator pedal 2 with sufficient force: on release of the pedal, the diaphragm resumes control.

It is desirable to avoid the rod 24 remaining clamped under circumstances when it is undesirable that the engine should attempt to maintain a constant vehicle speed, as during braking, the descent of steep hills, or in the event of sudden deceleration of the vehicle due to collision or running off a road. For this reason it will not normally be sufficient that the solenoid or equivalent device 30 be operated by a simple manual control switch 42 (see FIG. 3) and thus a further automatically acting switch 44 is provided which overrides the action of the switch 42 under certain circumstances. A preferred form of the switch 44 is shown in more detail in FIGS. 4a and 4b although it should be understood that other forms of switch could be employed which provide a similar acceleration triggered bistable function similar to that to be described. Moreover, whilst the control functions to be described are carried out by electrical means, it will be understood by those skilled in the art that similar functions could be carried out in whole or in part by pneumatic or hydraulic means.

Figure 4A:
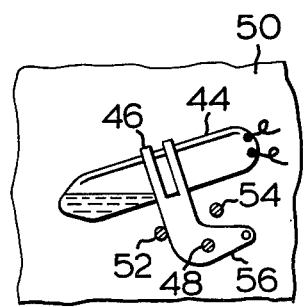
Figure 4B:
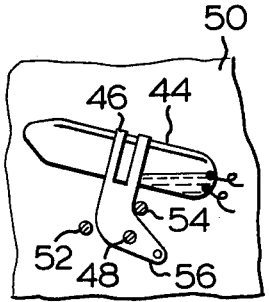

Referring to FIGS. 4a and 4b, the switch 44 comprises a conventional mercury switch module in which a pool of mercury is trapped in a glass tube having a pair of spaced switch contacts at one end. The tube may be tilted so that the mercury may either run to one end of the tube to submerge the contacts, thus closing the switch, or to the other end of the tube, thus opening the switch. The switch module is supported in a bracket 46 which is connected by a pivot 48 beneath the tube to a convenient portion 50 of the vehicle structure so that the end of the tube containing the contacts faces the front of the vehicle. Stops 52 and 52 are provided so that, when the vehicle is level and either stationary or travelling at a steady speed, the switch 44 can be in either of two stable positions, with the bracket 46 resting against one or other of the stops and the switch in either open or closed condition as shown respectively in FIGS. 4a and 4b. A forward or positive acceleration of the vehicle above a certain minimum will act to move the switch from the FIG. 4a to the FIG. 4b condition, whilst a negative acceleration or deceleration above a predetermined minimum will act to move the switch from the FIG. 4b to the FIG. 4a condition. In common with other acceleration responsive devices, the switch cannot distinguish between forces acting on it due to acceleration of the vehicle and forces acting upon it due to gravity, and thus location of the vehicle on upward or downward slopes of greater than predetermined gradients will have the same effects as acceleration or deceleration.

The effect of the switch 44 is that the action of switch 42 is overriden whenever the vehicle is decelerated sharply or driven down a steep hill, and this overriding action continues until the vehicle is again accelerated, or reaches an upward slope. The switch will normally be arranged so that whilst an appreciable slope or deceleration is required to move the switch to the FIG. 4a condition, only a slight acceleration is required for it to assume the FIG. 4b condition. As a result, the overriding action is provided only when required.

Figure 3:
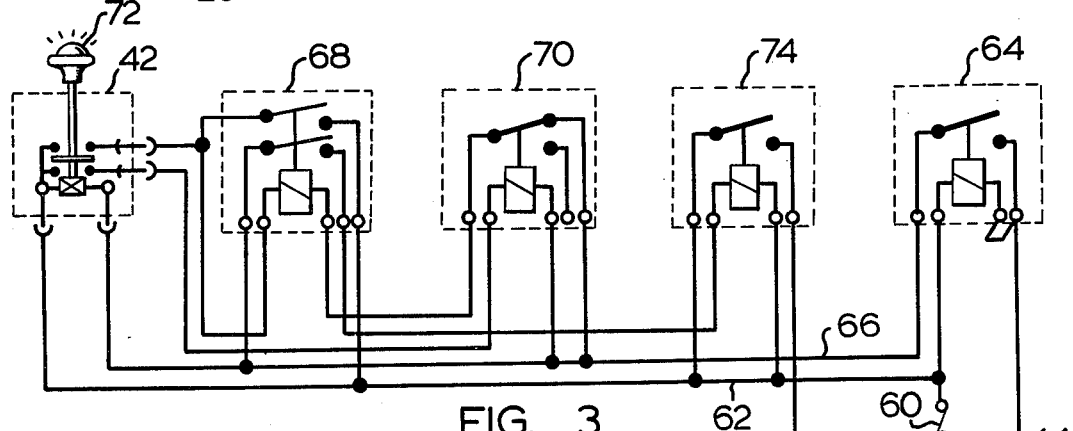

An exemplary control circuit incorporating the switches 42 and 44 is shown in FIG. 3. An electrical supply to the system is taken from the electrical supply of the vehicle via switch contacts in the main ignition switch 58 of the vehicle and a fuse 60 to a supply line 62. The coil of a first relay 64 with normally open contacts is connected to the line 62 and to ground via the switch 44, with the result that a line 66 is grounded via the contacts of relay 64 whenever the switch 44 is closed.

The switch 42 is a push-pull switch biased to a mid-position, with pairs of contacts momentarily connecting the line 62 to the coil of either a relay 68 or a relay 70 according to whether the switch is pushed or pulled. An indicator lamp 72, built into the switch pull, is connected between the lines 62 and 66 so that the lamp is illuminated whenever the switch 44 is closed. When the switch is pulled, the normally open contacts of the relay 68 are closed, thus completing an alternative circuit through the coil of the relay 68 and rendering it self-holding, and completing a circuit from the line 62 to the line 66 through the coil of a relay 74 so as to close its contacts and energize the solenoid 30. Thus the solenoid will be energized so as to clamp the rod 24 unless or until the action of the switch 42 in engaging, and the action of the relay 68 in maintaining engagement of, the control system of the invention is overridden by opening of the switch 44 or pushing of the switch 42.

When the switch 42 is momentarily pushed in, a circuit is completed through the coil of relay 70, thus deenergizing the coil of relay 68 and hence the coil of relay 74, resulting in isolation of the solenoid 30. The control system is thus switched out of action.

It may be desirable, particularly in the case of vehicles fitted with diesel engines, to provide for engine warm up at an engine speed above normal idling speed, and this may be done using the device of the invention to select a desired engine warm-up speed. To facilitate this, provision may be made to override the action of the switch 44, for example by a cable operated actuator acting to pull down an extension 56 of the arm 46.

It will also be understood that the invention is not solely applicable to motor vehicles, but may be utilized whenever it is desired to maintain the speed of an internal combustion engine substantially at a predetermined level, for example in marine or stationary engine applications, or when it is desired to operate several engines at the same speed.

What I claim is:

1. A speed control device for an internal combustion engine comprising a movable actuator member for connection to and conjoint movement with an accelerator linkage of the engine, a normally freely movable abutment member, a clamp device operable to clamp the abutment member in any of a range of positions, and a resilient connection established between the actuator member and the abutment member through a vacuum actuator in pneumatic connection with an inlet manifold of the engine.

2. A speed control device according to claim 1, wherein the vacuum actuator comprises a casing divided into two chambers by a flexible diaphragm, one of the actuator member and the abutment member being connected to the casing and the other passing through the casing and having a connection to the diaphragm, a vacuum pipe extending from one of the chambers establishing the vacuum connection to the inlet manifold.

3. A speed control device according to claim 2, wherein a spring is provided acting between the diaphragm and the casing so as to control the relationship between the vacuum applied to the one chamber and the relative displacement of the actuator member and the abutment member.

4. A speed control device according to claim 1, including means to enable and disable the clamp device, and an acceleration actuated bistable switch controlling said enabling and disabling means responsive to acceleration and deceleration of a vehicle to which the engine is fitted as a prime mover.

5. A cruise control device according to claim 4, wherein the enabling and disabling means is a solenoid, and the switch is a mercury switch rockably supported on the vehicle for movement between stable contacting and non contacting attitudes.

* * * * *